United States Patent

[11] 3,611,276

[72] Inventor Frank Massa
Cohasset, Mass.
[21] Appl. No. 798,310
[22] Filed Feb. 11, 1969
[45] Patented Oct. 5, 1971
[73] Assignee Massa Division Dynamics Corporation of America
Hingham, Mass.
Continuation-in-part of application Ser. No. 790,965, Jan. 14, 1969, now Patent No. 3,561,268.

[54] INSTRUMENT FOR DIRECT MEASUREMENT OF THE VELOCITY OF SOUND IN A FLUID
18 Claims, 8 Drawing Figs.

[52] U.S. Cl. .................................................. 340/3 R, 340/5 S, 340/3 E, 181/0.5 AP
[51] Int. Cl. .................................................. G01s 9/66
[50] Field of Search .................................... 340/3, 3 E, 5, 5 S, 8 S, 10; 181/0.5 AP

[56] References Cited
UNITED STATES PATENTS
2,970,666 2/1961 Smith .......................... 181/0.5
3,059,217 10/1962 Boswell ....................... 340/5
3,273,111 9/1966 Parenti ........................ 340/5
3,341,808 9/1967 Levin et al. ................. 340/5
3,436,720 4/1969 Patterson .................... 340/5 X

OTHER REFERENCES

Alexiou, ISA Journal, Vol. 8, No. 12 1961, pp. 46–50 (340-5)

Mitson et al., Deep Sea Research, Vol. 14, April 1967, pp. 259–261, 263 and 269

Primary Examiner—Richard A. Farley
Attorney—Louis Bernat

ABSTRACT: The invention provides a free-falling underwater body which has a weight-drag characteristic that causes a stable rate of fall through water. The body contains an oscillator connected to a piezoelectric transmitting transducer for radiating sound waves outwardly through the water at the oscillator-output frequency. Two sensors alter the oscillator-output frequency as a function of both the depth and speed of sound in the water. A receiver on the surface of the water receives the radiated sound waves and prints out a record of the depth and speed of sound in the water through which the falling body is then passing.

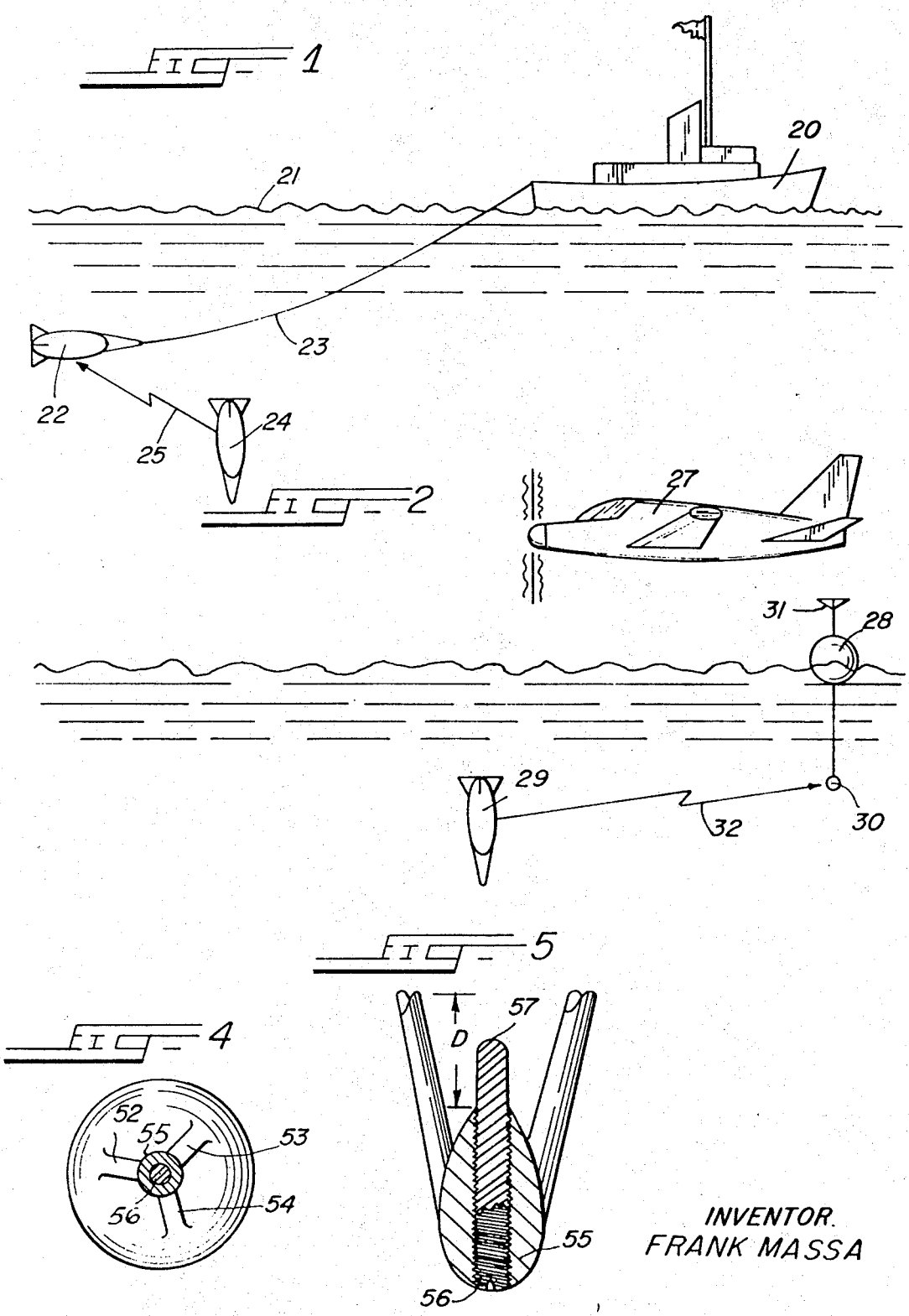
INVENTOR.
FRANK MASSA

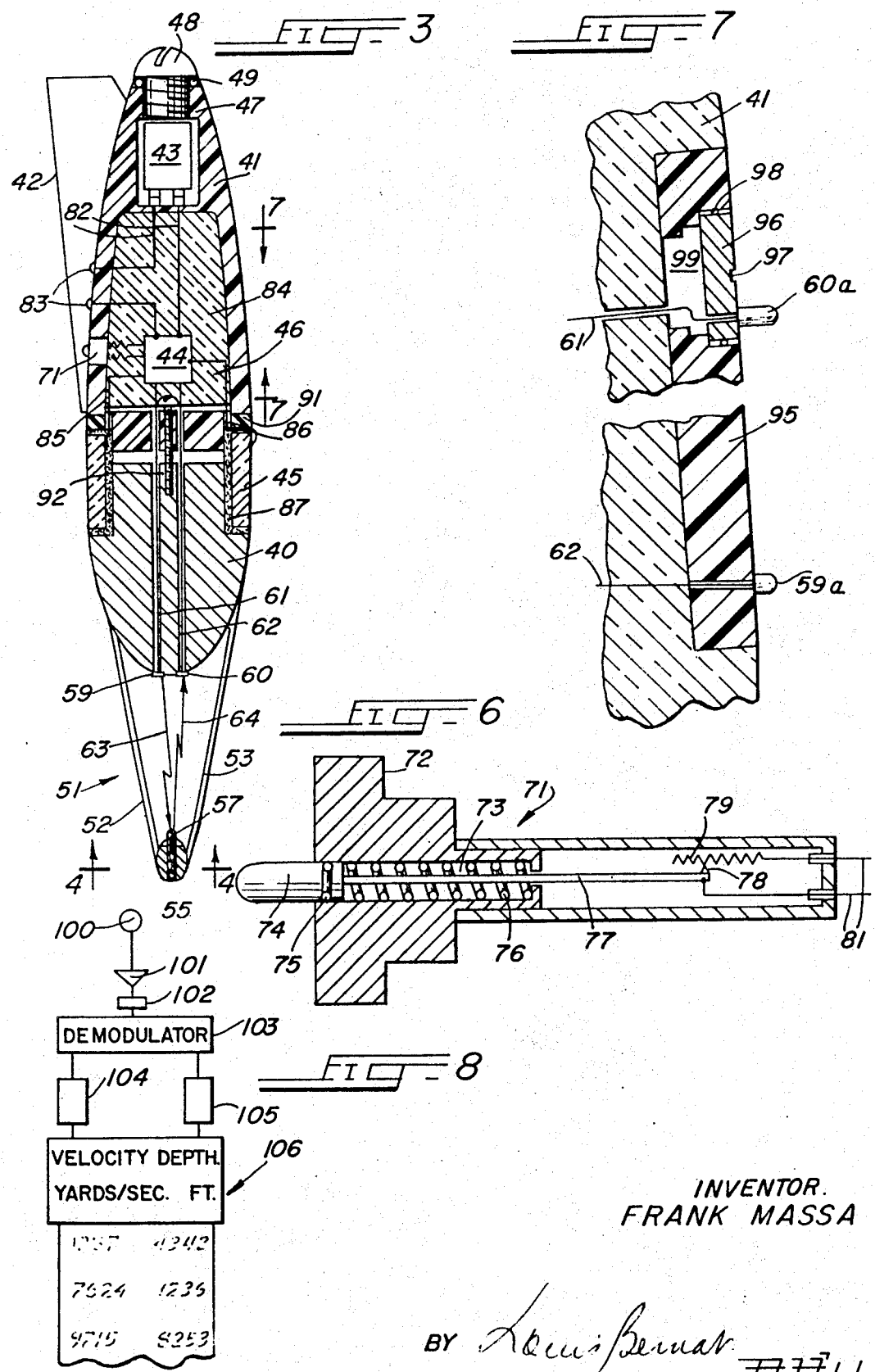

INSTRUMENT FOR DIRECT MEASUREMENT OF THE VELOCITY OF SOUND IN A FLUID

This is a continuation-in-part of my copending U.S. Pat. application Ser. No. 790,965, filed Jan. 14, 1969, now U.S. Pat. No. 3,561,268, entitled EXPANDABLE BATHYTHERMOGRAPH, and assigned to the assignee of this invention.

This invention relates to velocimeters, and more particularly to an expendable, completely free-falling underwater body containing an instrument for directly measuring the velocity of sound versus depth in a body of water, such as the ocean.

Underwater sonic equipment has many uses extending from finding fish and ocean depth through sophisticated ranging and navigating. In any number of different ways, this equipment generally depends upon transmitting a sonic signal and detecting the return of an echo. Calculations based upon the elapse of time between the transmission of a sonic signal and the return of an echo makes it possible to ascertain the distance between the sonic transmitter and the object reflecting the sonic energy. This elapsed time depends upon the speed of sound in water, and that speed depends at least in part upon the temperature of the water.

Heretofore, it has been customary for persons using sonic equipment to measure the temperature of the water extending from the surface down through the water toward the bottom of the ocean. Then, these persons have had to develop a profile of temperature versus depth. Thereafter, they consulted charts, tables, and other data to discover the speed of sound obtaining at the indicated temperature and depth. Only then could the user calibrate the sonic equipment to give a true readout, corrected for prevailing conditions. Obviously, this is a painstaking, time-consuming chore which introduces chances for human error as well as equipment failures.

Of course, there are many other reasons for a need to know the speed of sound in water. THerefore, the invention is not to be construed as necessarily limited to a use with particular sonar equipments referred to herein.

Accordingly, an object of this invention is to provide new and improved means and methods of measuring the velocity of sound in water. In particular, an object is to provide means for directly measuring the speed of sound in water or other fluids.

A further object of this invention is to transmit an acoustic signal from a velocimeter, the signal having a frequency which is an instantaneous function of the velocity of sound in water surrounding the element, and to modulate the acoustic signal at a frequency which is an instantaneous function of the depth of the velocimeter in the water.

A still further object of the invention is to provide a low-cost, expendable instrument for directly measuring the velocity of sound in water. Here, an object is to include an extremely low-cost method for calibrating the instrument.

Yet another object of the invention is to provide expendable velocimeters which may be deployed from either a ship which is underway or a flying airplane. Here an object is to provide a completely free-falling probe which is not restrained by wires or any other mechanical connections to the surface. An object is to provide an instrument which transmits telemetered signals from the falling probe to a ship or sonobuoy.

Still another object is to accomplish these and other objects by means of a probe which may be manufactured on general purpose machines without requiring a high initial capital investment in tools, jigs, and the like.

In keeping with an aspect of the invention, these and other objects are accomplished by a probe having a weight and streamlined hull configuration which enables it to drop at a predictable, fixed rate of fall. A transmitting and a receiving transducer are mounted on the probe. The transmitting transducer sends repeated sonic signals to the receiving transducer; whereupon, an oscillator circuit in the probe varies its output frequency as a function of the prevailing ambient speed of sound, as indicated by the time required for sound to travel from the transmitting to the receiving transducer. A ring-shaped piezoelectric transducer is driven by the output of this oscillator. Hence, a monitor station may detect the sonic-velocity-versus-depth profile responsive to the frequency of a sonic or acoustic signal which it receives.

A pressure sensor transducer converts the hydrostatic pressure, acting upon the probe, into an electrical quantity. This quantity controls a signal which indicates the depth of the probe in water. Preferably, this depth-indicating signal is a low frequency signal which may modulate another, higher frequency signal that represents the speed of sound in the water. This way, the probe may transmit one signal which simultaneously indicates both both depth and velocity information. Or, the depth may be calculated as a function of time, since the fall rate is known because the weight and streamlined hull of the probe creates a known gravity-drag relationship.

These and other objects are accomplished in a preferred embodiment of the invention which may be understood from a study of the following description when taken in connection with the accompanying drawings in which:

FIG. 1 schematically shows a system including a moving ship towing an omnidirectional hydrophone for picking up acoustic signals transmitted from a free-falling velocimeter probe;

FIG. 2 schematically shows a system including a flying airplane and a floating sonobuoy for relying acoustic signals from the probe to the airplane;

FIG. 3 is a cross-sectional view of a velocimeter probe for sending telemetered signals to the ocean surface via an acoustic carrier;

FIG. 4 is an end plan view of the probe, taken along line 4—4 of FIG. 3;

FIG. 5 is an enlarged cross-sectional view of a sound-reflecting surface at the forward tip of the probe;

FIG. 6 is a cross-sectional view which shows a pressure sensor for causing a modulation of the telemetered signals as a function of the instantaneous depth of the probe;

FIG. 7 is a cross-sectional view, taken along the section lines 7—7 of FIG. 3, which shows a second embodiment of the invention; and FIG. 8 is a block diagram which shows a system for printing out the depth-versus-sonic-speed profile.

The broad principles of the total system are shown by FIGS. 1 and 2. In greater detail, FIG. 1 shows a ship 20 which is travelling at a fairly high speed through the water 21. It is towing an omnidirectional hydrophone receiver 22 at the end of a line 23. The ship has dropped overboard a free-falling velocimeter probe 24. As the probe 24 falls freely through the water, it sends acoustical telemetered signals 25 which are picked up by the towed hydrophone receiver 22 and relayed over cable 23 to shipboard receiver equipment.

In the system of FIG. 2, a flying airplane 27 is pictured as having dropped a sonobuoy 28 and a free-falling velocimeter probe 29. The sonobuoy 28 includes an omnidirectional hydrophone 30 and an antenna 32. A radio transmitter is inside the sonobuoy 28. As the probe 29 falls through the water, it sends acoustical telemetered signals 32 which are picked up by the hydrophone 30 and broadcast from the antenna 31 to the flying airplane.

In keeping with an aspect of the invention, each of these systems uses the same underwater, free-falling velocimeter probe, which is shown in cross section detail in FIG. 3. The major portions if this probe are a nose section or weight 40, a tail section or hull 41, a suitable number of stabilizing fins (one of which is seen at 42), a battery 43, an electronic equipment 44, and an omnidirectional piezoelectric transmitting transducer 45. The nose weight 40 includes any suitable streamlined element, such as a zinc diecasting, for example.

As will become more apparent, the electronic equipment includes all circuits required to perform the described function, which eventually cause an information signal or frequency to be sent out. Since a frequency is the end product of the electronic circuitry, it will be convenient to refer to the box 44 as an "oscillator"; however, the broader connotations of this term should be kept in mind.

The tail section or hull 41 may be a molded waterproof plastic piece part having the fins 42 integrally formed thereon, a cavity 46 in the forward section, and a opening 47 in the rear section. The forward cavity 46 houses the oscillator 44 and suitable wiring. The oscillator may operate in, say, the 15–30 kHz. range. The threaded opening 47 is sealed by a screw 48 and an O-ring 49 clamped under the head of the screw 48. When the screw 48 is removed, the battery 43 may be inserted into the opening in order to power the oscillator 44.

The nose weight 40 carries a superstructure 51 comprising a tripod 52, 53, 54 projecting outwardly in front of the probe and terminating in a streamline socket body 55. The body 55 includes a threaded opening or passageway for receiving a screw having threads at one end and a reflecting tip 57 at the other end. The length if the threaded passageway is such that the tip 57 may be moved over a distance D which may be about 1¾ inches to 2 inches, the movement being made by the simple expedient of turning the screw 56. Any suitable means may be used for locking the screw 56 in the selected location. For example, the body 55 may be a split casing which squeezes the screw 56. Also, interference threads, setscrews, lock nuts or the like may be used to hold the screw 56 in place.

Mounted on the front of the nose weight 40, and facing the reflecting tip 57, are two small transducers 59, 60 connected to oscillator 44 via wires 61, 62. The transducers 59, 60 are high frequency piezoelectric, electroacoustic devices, each of which might include a tiny quartz crystal or polarized ceramic plate which vibrates efficiently in the thickness dimension. Operation is at high frequencies, preferably in the megacycle region.

In operation, the transducer 59 transmits sound waves 63 through the ocean water. These waves are reflected from the tip 57 as sound waves 64 that are picked up by the receiving transducer 60. If the distance 63, 64 is made exactly 1/10 of a meter or yard, for example, the speed of sound may be read out directly in terms of meters or yards per second. The adjustable tip 57 moves far enough to select either meters or yards, at the user's option. Of course, the distance may also be adjusted to give a readout in terms of feet per second, or any other suitable parameters.

The oscillator 44 may take any suitable form and be arranged to include a shock-excited circuit. In greater detail, any suitable means may cause the oscillator 44 to send an initial burst of sonic energy at a predetermined frequency to the transmitting transducer 59. The resulting sound wave is sent out through the water, reflected, and received by the receiving transducer 60. This receipt shock excites the oscillator 44 into sending a second burst of sonic energy into the transmitting transducer 59, again at the predetermined frequency. Hence, the repetition rate of these bursts of sonic energy becomes higher responsive to an increase if the velocity of sound in the water. Or, the repetition rate of these bursts becomes lower when the velocity decreases.

The higher the predetermined frequency the oscillator operation, the greater will be the accuracy in the measurement of the velocity of sound. In order to achieve a reasonably acceptable precision, it is essential for the predetermined frequency of the signal sent out by the transducer 59 to be at least ten times greater than the frequency radiated by the omnidirectional transducer 45, Preferably, the transducer 59 should operate at a frequency which is approximately 100 times greater than the operating frequency of the transducer 45.

In addition to the shock-excited circuit, the oscillator 44 includes means for providing an output frequency $f_1$ which changes as a function of the speed of sound in the ocean water through which the probe is falling. The frequency $f_1$ is actually the repetition rate frequency at which successive tone bursts take place in the sing-around circuit that is included in the electronics package which is symbolically referred to throughout the specification as an "oscillator." That is, the frequency $f_1$ changes as a function of the time required for the round trip 63, 64. A pressure sensor 71 may be arranged to modulate the oscillator output frequency $f_1$ as a function of depth; or, it may cause the oscillator to produce a second, depth-indicating frequency $f_2$ widely separated from the velocity-indicating frequency frequency $f_1$. Either way, the oscillator 44 produces a signal which varies as a function of both the velocity of sound and the depth of the probe.

The depth sensor is a device which is operated responsive to hydrostatic pressure, as shown in FIG. 6. The major parts of this sensor are a flanged faceplate housing 72 having a central bore 73 therein. Slidably mounted in the central bore 73 is a piston 74 having an O-ring 75 for sealing out the sea water. A spring 76 biases the piston 74 to an extended position. The hydrostatic pressure in the ocean pushes the piston 74 against the spring 76 and into the flanged housing 72. A push rod 77 moves in unison with the piston 74. The push rod carries a slider contact 78 associated with a potentiometer 79. Thus, the resistance across the wires 81 changes as a function of the hydrostatic pressure pushing the piston 74 inwardly against the force of spring 76.

Finally, the energy of the battery 43 (FIG. 3) is applied to the oscillator 44 via wires 82 which are broken at the two terminals 83 to form a sea water switch on the surface of the tail hull 41. When the probe is dropped into the ocean water, the minerals in the sea water cause a current to flow between the terminals 83. Hence, the ocean water automatically turns on the oscillator when the probe is dropped overboard. An alternative construction uses a sea water battery, and the screw 48 is arranged to admit sea water into the battery compartment at 43. In this construction the water switch 83 is omitted After these parts are in place in the cavity 46, a suitable potting compound 84 is poured into the cavity. The potting compound may also be an epoxy, for example.

The transmitting transducer 45 is preferably a cylindrical shell of piezoelectric ceramic material, such as polarized barium titanate or lead zirconate titanate. The dimensions and contours of the ceramic shell are selected to continue the streamlined shape of the probe. The inside and outside circumferential sides of the cylinder are separately covered by metallic electrodes. These inside and outside electrodes are connected to the oscillator 44 output terminals via wires 85, 86, respectively. The cylindrical shell 45 "floats" in a pressure-release material 87 which fills in the cavity behind and around the ceramic ring 45. The well-known corprene material may be used for this purpose.

A disk or bulkhead 91 is used to join the nose-section weight 40 and the tail-section hull into a continuous streamlined body. Preferably, the disk is made from a waterproof plastic insulating material. In greater detail, both top and bottom sides of the disk 91 are circumferentially undercut about its periphery. The undercut region on the bottom of disk 91 fits within the ring-shaped opening formed by the pressure-release material 87. The undercut region on the top of the disk 91 fits within the open cavity of the tail hull 41.

After the nose weight 40 and the tail hull 41 are constructed as described above, the wires 85, 86 are threaded through clearance holes in disk 91. The disk 91 is fitted into the pressure-release ring-shaped element 87. A bolt 92 attaches the disk 91 to the weight 40. Thereafter, the wires 85, 86 are connected to the output of the oscillator 44. Then, the tail section hull 41 is cemented to the top of the disk 91. Next, the entire unit is coated with a waterproof material, except for the terminals of the sea water switch 83.

The relative dimensions of the probe are somewhat important, although the parameters of such dimensions may vary over a fairly wide range. For 15–30 kHz. operation, the outside diameter of the ceramic ring 45 is in the general range of 1½ to 2 inches. For omnidirectional operation, the vertical height of the transducer cylindrical ring 45 should then be in the range of one-fourth to three-fourths of the wavelength of the radiated sound. In the 15–30 kHz. range, this means that if the height of the ring 45 is about one-half to one and one-fourth times the outside diameter, the transmitting transducer will have an omnidirectional transmission pattern.

The remainder of the dimensions are set by the desired rate at which the probe drops through water. The weight and streamlined shape should be such that the velocimeter drops through the water at a high rate of speed. THe probe should quickly reach a fixed drop speed at which the drag of the water equals the pull of gravity. Thereafter, the drop rate will remain constant.

An alternative embodiment (FIG. 7) eliminates the superstructure 51 of FIGS. 3–5 and, instead, uses a pair of transducers mounted on the side of the probe. In greater detail, a plate 95 (which may be metal) is molded onto the side of the tail section 41. A transmitting transducer 59a and a receiving transducer 60 a are mounted in the plate to perform the sound-transmitting function of the transducers 59, 60, as described above. These transducers 59a, 60a are connected to the oscillator 44 via the wires 61, 62. Again, if the distance between the two transmitters 59a, 60a is made exactly one-tenth of a meter or a yard, the readout may be taken directly in terms of meters or yards; or, any other suitable relationship may be established.

To provide means for calibrating this distance, at least one of the transducers is mounted near the rim of a rotating disk 96 having a slot 97 therein. The disk 96 is sealed to the plate 95 by means of an O-ring seal 98. A clearance space 99 is provided behind the disk 96 in order to allow a movement of the wire 61. Thus, if a screwdriver blade, for example, is placed in the slot 97 and the disk 96 is turned, the transducer 60a approaches toward or recedes from the transducer 59a. This way the distance may be calibrated (preferably during manufacture) to be one-tenth if a meter or yard, as required. After such calibration, the entire unit may be sealed in a waterproof manner. This will both protect the probe against ocean water and lock the disk 96 in position.

THe embodiment of FIG. 7 offers certain advantages since there is no direct coupling between closely spaced transmitting and receiving transducers. Moreover, there is less noise responsive to ambient reflections from adjacent superstructure parts. An advantage of the structure of FIGS. 3–5 is that the tripod 52–54 and screw 57 may have compensating coefficients of expansion or contraction responsive to temperature change. Thus, the total distance 63, 64 does not change when the water temperature changes.

The operation of the system should become clear from FIG. 8. As the probe (FIG. 3) drops through the water, the oscillator-output frequency changes as a function of the speed of sound in the ocean water through which the probe is then passing. The pressure sensor 71 preferably changes a second oscillator frequency as a function of depth; although, it may also modulate the oscillator-output frequency which represents velocity. Either way, the piezoelectric ring 45 radiates sound at the frequencies which identify both the velocity of sound in the water and the depth of the probe.

The surface hydrophone receiving transducer 22 or 30 (FIGS. 1, 2) receives the sound radiated by the transducer 45. Either receiving transducer is shown at 100 in FIG. 8. The output of the receiving transducer is fed through an amplifier 101 on shipboard; or, it is broadcast over antenna 31 to a receiver and amplifier 101 on the aircraft.

The variable frequency picked up by the hydrophone 100 is applied to a band-pass filter arrangement 102 which passes the frequencies sent out from the probe and rejects the general background noise. This filtering extends the range over which the probe signal may be received. A demodulator 103 separates the velocity and depth signals, which are then covered into digital signals by any known devices 104, 105. These digital signals are then printed out as at 106, as either a velocity relative to depth or a velocity relative to time, at the user's option. An alternative printout would include a pen recorder for drawing a graph which represents the velocity-depth profile.

One modification which falls within the scope and spirit of the invention relates to submarine usage. Here the nose weight 40 is changed into a hollow sphere having a positive buoyancy. When the probe is released, it rises to the surface and gives a velocity-depth profile reading on the way up.

One important feature of this invention permits the construction of a low-cost expandable instrument which has a high degree of accuracy. This is due, in part, to the simple method which I employ to calibrate the instrument. After the complete unit is assembled and ready to operate, it is immersed in a water bath in which the temperature is very accurately maintained. Thus, the velocity of sound in the water bath is very accurately known. Each production unit, immersed in this known environment, generates a signal which is compared with a standard reference signal. Then the set screw 56 or disk 96 is adjusted until the frequency generated by the probe corresponds exactly with the standard frequency. Thereafter, the screw 56 and the disk 96 are locked in position.

Still other modifications will readily occur to those who are skilled in the art. Therefore, the claims are to be constructed broadly enough to cover all equivalents falling within the true scope and spirit of the invention.

I claim:

1. An instrument for measuring the velocity of sound in a body of water, said instrument comprising a streamlined structure having a weighted nose section and a streamlined tail section, a first omnidirectional electroacoustic transducer for radiating sound at first frequency into the water surrounding said streamlined structure, said electroacoustic transducer having a sound-radiating surface smoothly blended into outer surface contour of said streamlined structure, a second electroacoustic transducer for radiating acoustic signal bursts of sound at a predetermined frequency which is greater than said first frequency, a sound-reflecting target means rigidly mounted in the path of said second electroacoustic transducer, means for adjusting the distance between said target sand said second electroacoustic transducer, means for driving said second electroacoustic transducer to cause the radiation of acoustic signal bursts of said predetermined frequency, means responsive to the interception of said acoustic signal burst by the target for reactivating said driving means for triggering the next acoustic signal burst, whereby said acoustic signal bursts recur at a repetition rate jointly dependent up on the distance between the target and said second transducer means and upon the velocity of sound in the medium between the target and said second transducer means, means for converting said repetition rate frequency into an alternating-current signal having a frequency representative of said repetition rate, and means driving said first transducer means at said alternating-current frequency.

2. The invention of claim 1 wherein said target includes a third electroacoustic transducer for converting said acoustic signal bursts of sound into electrical signals, and means for applying said last named electrical signals to control said converting means for establishing said alternating-current signal.

3. The invention of claim 2 wherein said second and third electroacoustic transducers are mounted side by side on the nose section of said streamlined structure, and said reflecting target is rigidly located at a distance away from said nose section.

4. The invention of claim 3 wherein said target is mounted on a rigid frame structure fixed to said nose section.

5. The invention of claim 4 and means in said frame structure for making fine adjustments of the distance to said target.

6. The invention of claim 5 characterized in that the temperature coefficient of linear expansion of the material of the frame structure is less than the coefficient of expansion of the material of the target structure with respect to said distance.

7. The invention of claim 1 wherein said target comprises a third electroacoustic transducer operated responsive to the receipt of the predetermined frequency of the acoustic signals generated by said second transducer, said third transducer being rigidly mounted in a spaced-apart relationship with respect to said second electroacoustic transducer means, and mechanical means for adjusting said spaced-apart relationship.

8. The invention of claim 7 characterized in that said mechanical adjustment means permits a variation in said spaced-apart relationship over a linear distance of approximately one-tenth yard to one-tenth meter.

9. The invention of claim 7 wherein said second and said third electroacoustic transducers are located on the outside surface of said streamlined structure and along generally the longitudinal axis of said streamlined structure.

10. The invention of claim 1 wherein said streamlined structure has a generally round cross section, said first electroacoustic transducer being a polarized ceramic of tubular shape blended into a circumferential wall surface of said streamlined structure.

11. The invention of claim 10 further characterized in that said ceramic tube has an outside diameter lying within the approximate range of 1½ to 2 inches and further characterized in that the frequency of said alternating-current signal lies within the approximate range of 15–30 kHz.

12. The invention of claim 10 further characterized in that said ceramic tube is made of polarized lead zirconate titanate and the height of the ceramic tube lies within the approximate range of one-half to one-fourth times the diameter of the tube.

13. An instrument for measuring the velocity of sound in a body of water, said instrument comprising a streamlined structure having a generally round cross section, a weighted nose section, and a streamlined tail section, a first omnidirectional electroacoustic transducer comprising a polarized ceramic of tubular shape for radiating sound at first frequency into the water surrounding said streamlined structure, said electroacoustic transducer having a sound-radiating surface with the outer wall of said tube circumferentially and smoothly blended into the outer surface contour of said streamlined structure, a second electroacoustic transducer for radiating bursts of sound at a predetermined frequency which is greater than said first frequency, a sound-reflecting target means rigidly mounted in the path of said second electroacoustic transducer, means for adjusting the distance between said target and said second electroacoustic transducer, means for driving said second electroacoustic transducer to cause the radiation of acoustic signal bursts of said predetermined frequency means responsive to the interception of said acoustic signal burst by the target for reactivating said driving means for triggering the next acoustic signal bursts, whereby said acoustic signal bursts recur at a repetition rate jointly dependent upon the distance between the target and said second transducer means and upon the velocity of sound in the medium between the target and said second transducer means, means for converting said repetition rate frequency into an alternating-current signal having a frequency representative of said repetition rate, means driving said first transducer means at said alternating current frequency, said nose section comprising a weighted cylindrical body section, said first electroacoustic transducer comprising a tubular element having an outside and inside diameter, said cylindrical body section being reduced in diameter to provide circumferential dimensional clearance for receiving the inside diameter of said first transducer, a circular disk member shaped for rigid coaxial assembly with the cylindrical body section, said circular disk being undercut at its periphery to a depth of reduced diameter having approximately the same dimension as the reduced diameter of said cylindrical body section, said first transducer being secured within the recessed cylindrical space provided by the undercut peripheries, electrical conductor means connected to said first transducer and passing through said disk member, fastening means for securing the axial alignment of said nose subassembly, said first transducer, said disk member, said tail section comprising a generally hollow tapered streamlined housing, electronic circuit means located within said housing, said electronic means including output terminal for providing an oscillating electrical power for driving said first transducer, and means for rigidly securing said tail section housing in axial alignment to the periphery of said disk member, thereby joining said two subassemblies.

14. A free-falling instrument for measuring the velocity of sound in a body of water, said instrument comprising velocity-sensor means for instantaneously converting the speed of sound in the body of water into a first electrical quantity, pressure-sensor means for instantaneously converting the water pressure acting on said free-falling instrument into a second electrical quantity, means for converting said first electrical quantity to a first oscillatory electrical signal of frequency $f_1$, means for converting said second electrical quantity to a second oscillatory electrical signal of frequency $f_2$, which is widely separated from the frequency $f_1$, means for combining the two oscillatory electrical signals so that the lower frequency signal modulates the higher frequency signal, electroacoustic-transducer means for converting said modulated electrical signals to corresponding acoustic signals which are radiated outwardly into said body of water, and means for applying said modulated electrical signal to said electroacoustic-transducer means.

15. The invention of claim 14 and a receiving hydrophone for converting said acoustic signals into electrical signals, means for separating said frequencies $f_1$ and $f_2$ from said electrical signals, and means for simultaneously recording said separated frequencies as a function of time.

16. An instrument for measuring the velocity of sound in a body of water, said instrument comprising a hull having a positive buoyancy, whereby said instrument rises to the surface when launched from a submerged submarine, said instrument further comprising a velocity-sensor means for instantaneously converting the speed of sound in the body of water into a first electrical quantity, pressure-sensor means for instantaneously converting the water pressure acting on said free-rising instrument into a second electrical quantity, means for converting said first electrical quantity to a first oscillatory electrical signal of frequency $f_1$, means for converting said second electrical quantity to a second oscillatory electrical signal of frequency $f_2$, which is widely separated from the frequency $f_1$, means for combining the two oscillatory electrical signals so that the lower frequency signal modulates the higher frequency signal, electroacoustic transducer means for converting said modulated electrical signals to corresponding acoustic signals which are radiated outwardly into said body of water, and means for applying said modulated electrical signal to said electroacoustic transducer means.

17. The instrument of claim 14 and calibrating means associated with said instrument for adjusting a critical distance associated with said velocity-sensor means, said critical distance extending between an electroacoustic transducer and a target on said instrument, said calibrating means comprising a body of water in which the velocity of sound is accurately known, means for reading the velocity of sound as measured by the instrument being calibrated, and means for adjusting the critical distance until the velocity of sound as measured by the instrument agrees with the known velocity of sound.

18. An instrument for measuring the velocity of sound in a body of water, said instrument comprising a streamlined structure having a weighted nose section and a streamlined tail section, a first omnidirectional electroacoustic transducer for radiating sound at a first frequency into the water surrounding said streamlined structure, said electroacoustic transducer having a sound-radiating surface smoothly blended into the outer surface contour of said streamlined structure, a second electroacoustic transducer for radiating bursts of sound at a predetermined frequency more than 10 times greater than said first frequency, a sound-reflecting target means rigidly mounted in the path of said second electroacoustic transducer, means for adjusting the distance between said target and said second electroacoustic transducer, means for driving said second electroacoustic transducer to cause the radiation of acoustic signal bursts of said predetermined frequency, means responsive to the interception of said acoustic signal burst by the target for reactivating said driving means for triggering the next acoustic signal burst, whereby said acoustic signal bursts recur at a repetition rate jointly dependent upon the distance between the target and said second transducer means and upon the velocity of sound in the medium between the target and said second transducer means, means for converting said repetition-rate frequency into an alternating-current signal having a frequency representative of said repetition rate, and means driving said first transducer means at said alternating-current frequency.

UNITED STATES PATENT OFFICE
CERTIFICATE OF CORRECTION

Patent No. 3,611,276   Dated   October 5, 1971

Inventor(s) Frank Massa

It is certified that error appears in the above-identified patent and that said Letters Patent are hereby corrected as shown below:

Column 8, line 10, after "frequency" and before the comma (,) "$f_1$" should read -- $f_2$ -- .

Signed and sealed this 12th day of December 1972.

(SEAL)
Attest:

EDWARD M. FLETCHER, JR.
Attesting Officer

ROBERT GOTTSCHALK
Commissioner of Patents